United States Patent [19]

Hamilton et al.

[11] 4,002,450
[45] Jan. 11, 1977

[54] METHOD OF AND APPARATUS FOR BENDING GLASS SHEETS TO RELATIVELY SHARP ANGLES

[75] Inventors: Harold E. Hamilton, Toledo; Paul V. Pastorek, Rossford; Floyd T. Hagedorn, Oregon; Robert G. Revells, Toledo, all of Ohio

[73] Assignee: Libbey-Owens-Ford Company, Toledo, Ohio

[22] Filed: Mar. 14, 1975

[21] Appl. No.: 558,288

[52] U.S. Cl. .................................. 65/107; 65/289; 65/288; 65/374 RM
[51] Int. Cl.² .......................................... C03B 23/02
[58] Field of Search ............ 65/107, 114, 287, 289, 65/288, 374 RM, 348

[56] References Cited
UNITED STATES PATENTS

| | | | |
|---|---|---|---|
| 3,253,898 | 5/1966 | Leflet, Jr. .................... | 65/107 X |
| 3,762,904 | 10/1973 | Hamilton et al. .................... | 65/107 |
| 3,865,680 | 2/1975 | Reese et al. .................... | 65/107 X |

*Primary Examiner*—Arthur D. Kellogg
*Attorney, Agent, or Firm*—Collins, Oberlin & Darr

[57] ABSTRACT

A method of and apparatus for bending a flat sheet of glass to a relatively sharp angle. The apparatus includes a sectionalized, gravity mold structure provided with means for delivering electrical power to electrically conducting lines formed on the sheet supported on the mold apparatus and which lead to an electrically conductive path also formed on the sheet along a line about which it is desired to bend the sheet. Opposed electrical conductors, which also serve as locator stops, are biased into engagement with portions of the conducting lines to assure continuous current flow thereto during the bending and movement of the sheet into its desired configuration.

21 Claims, 21 Drawing Figures

METHOD OF AND APPARATUS FOR BENDING GLASS SHEETS TO RELATIVELY SHARP ANGLES

BACKGROUND OF THE INVENTION

The present invention relates generally to the production of bent sheets or plates of glass and, more particularly, to an improved method and apparatus for bending glass sheets to relatively sharp angles.

One well-known technique for bending glass sheets, such as those intended for use as glazing closures in vehicles or the like, utilizes a ring or skeleton-type bending mold having shaping surfaces adapted to engage only the marginal edge portions of the sheets, to avoid marring the viewing area of the finished glazing closure, and conforming in elevation to the curvature of the sheet when bent. According to this technique, a flat sheet of glass is supported on the mold above the shaping surface and is heated in a furnace to a temperature corresponding to the softening point of glass whereupon the sheet sags by gravity into engagement with the shaping surfaces of the mold. Very often, the mold is sectionalized to permit relative movement of the sections thereof during the sagging of the heated glass to impart rather complex curvatures to the glazing closures incorporated in modern day vehicle designs, for example. While the bent sheet is still resting on the mold after being shaped to the desired configuration, it is cooled or annealed in a controlled manner to a point below the annealing range of glass.

In addition to the complex curvatures mentioned above, it is often desirable to provide a relatively sharp angled or V-shaped bend in the glazing closure transversely or longitudinally thereof along one or more lines to effect wrap-around of a windshield or backlight into the roof line of the vehicle or into the side surfaces thereof. The formation of such bends, i.e., V-shaped bends or bends having very small radii of curvatures, by the above described "gravity" bending technique poses problems in fabrication.

A solution to such problems was provided by the glass bending methods disclosed and claimed in U.S. Pat. Nos. 3,762,903 and 3,762,904, assigned to the same assignee as the present invention, whereby an electrically conducting path is formed on at least one surface of the glass sheet along the line about which it is desired to sharply bend the sheet. The sheet is then supported on a suitable mold structure and heated in a furnace to a temperature corresponding to the softening point of the glass, causing it to sag by gravity into conformance with the shaping surfaces of the mold while simultaneously passing an electric current through said path to heat the area of the glass sheet immediately adjacent said path to a temperature above the aforementioned softening point, causing said sheet to bend along said path to form the desired relatively sharp angle therein. It can be appreciated that in a completely automated, mass production operation, means must be provided for supplying current to the electrically conducting path automatically during the transport of the glass through the heating furnace.

SUMMARY OF THE INVENTION

Accordingly, it is a primary object of the present invention to provide a new and improved method of and apparatus for bending glass sheets to relatively sharp angles in a mass production operation.

It is another object of this invention to provide an improved, sectionalized bending mold apparatus having electrical conducting means to deliver current to portions of the glass sheet supported thereon for effecting relatively sharp bends therein.

It is a further object of this invention to provide an improved apparatus for bending glass sheets to relatively sharp angles including a furnace provided with electrical contacting means in combination with a mold structure provided with electrical conducting means for supplying electrical current to the glass sheets supported on said mold structure during the passage thereof through said furnace.

In one aspect thereof, the apparatus of the present invention is characterized by the provision of a sectionalized articulated mold having electrically conducting means thereon for supplying electrical current from a suitable source to an electrically conducting path on a glass sheet positioned on the mold to heat the sheet along the line about which the bend is effected. Electrical contactor stops, which also serve as locator stops, are mounted at opposite ends of the mold and are urged into engagement with conductor lines formed on the glass sheet and leading to the electrically conducting path to assure continuous current flow to the path upon movement of the sheet during bending.

The foregoing and other objects, advantages, and characterizing features of the present invention will become clearly apparent from the ensuing detailed description of an illustrated embodiment thereof, taken together with the accompanying drawings wherein like reference characters denote like parts throughout the various views.

DESCRIPTION OF THE PREFERRED EMBODIMENT

Figure 1:
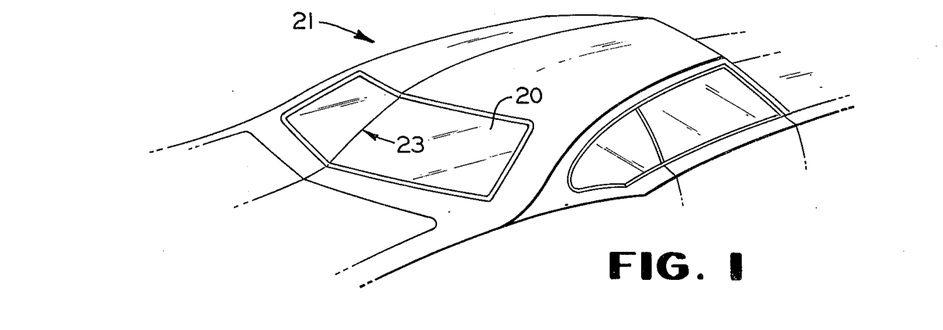
FIG. 1 is a perspective view of an automobile including an illustrated bent glass rear window or backlight produced in accordance with the method and apparatus of the present invention.
Figure 2:
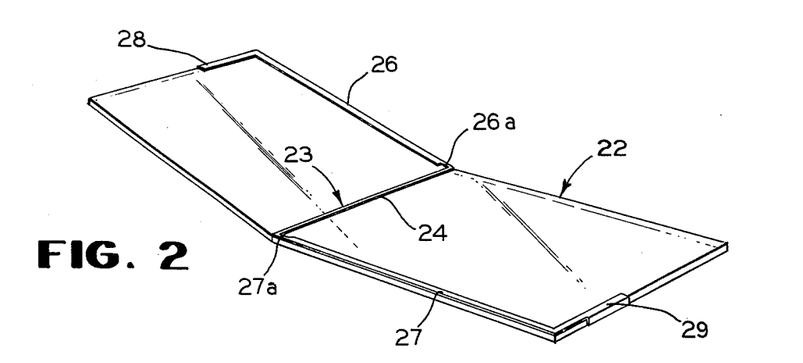
FIG. 2 is a perspective view of the backlight prior to bending.

Referring now in detail to the drawings, there is depicted in FIG. 1 a backlight 20 bent to a relatively sharp angle in accordance with the method and apparatus of this invention and shown installed in an automobile 21. The backlight 20 is comprised of a single glass sheet 22 (FIG. 2) of a sharply bent V-shaped configuration, being bent along a straight line path indicated generally at 23 extending from one longitudinal edge of the glass sheet to the other, centrally of and parallel to the opposite transverse edges of the sheet. The path or axis of the bend is defined by a fired electrically conducting line 24 connected at its opposite ends to oppositely directed conductor lines 26 and 27 extending along the opposite longitudinal edges of the sheet and provided with right angularly related inturned portions 28 and 29, respectively, extending along the opposite transverse edges of the sheet. The function of conducting line 24, as well as the conductor lines 26, 28 and 27, 29 will hereinafter be described in detail. While it will be convenient to describe the method and apparatus of this invention in connection with the formation of a backlight having a single sharp angular bend therein, it should be understood that the principles of this invention are equally applicable in the production of glass sheets having multiple angular bends and/or multiple layered sheets of glass, such as conventional laminated windshields for example, or any glazing in which it is desired to form one or more sharp angular bends therein.

Figure 3:
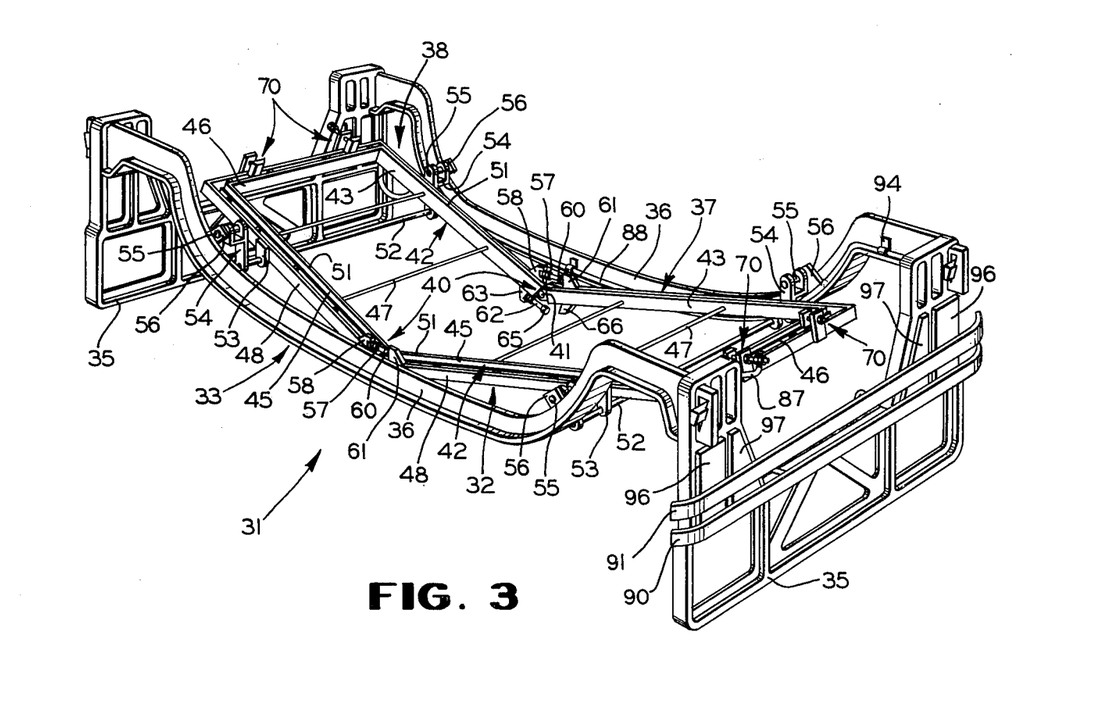
FIG. 3 is a perspective view of a mold assembly incorporating the novel features of the present invention.

In accordance with this invention, bending apparatus in the form of a mold assembly, comprehensively designated 31 and shown in its entirety in FIG. 3, is employed to form the sharp bends in the finished product. The mold assembly 31 comprises a skeleton-type mold 32 mounted on a substantially rectangularly shaped support frame 33. This frame comprises a pair of upwardly extending end members 35 which are connected to each other at their upper ends by a pair of parallel, longitudinally extending mold supports 36 whose contour in elevation corresponds generally to the shape of the skeleton-type mold 32.

Figure 6:
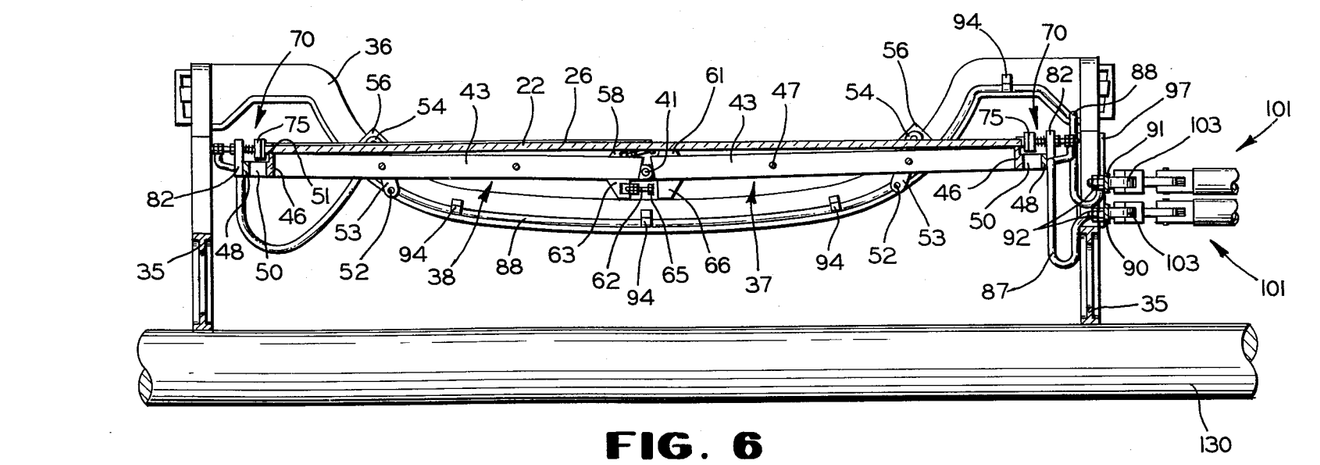
FIG. 6 is a longitudinal sectional view, taken along the line 6—6 of FIG. 5, showing the mold assembly in an open, glass receiving position.
Figure 7:
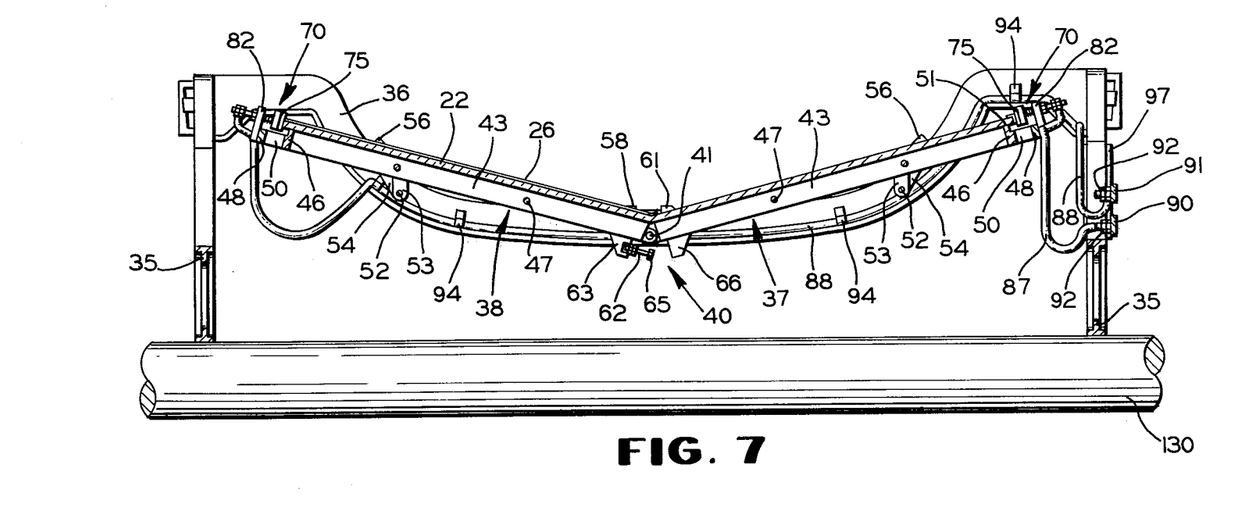
FIG. 7 is a view similar to FIG. 6, but showing the mold assembly in a closed position.

The mold 32 comprises a pair of mold sections 37 and 38 pivotally connected together adjacent their inner ends by means of diametrically opposed hinge assemblies, generally designated 40, for pivotal movement between an open, glass receiving position shown in FIG. 6 and a closed, final position shown in FIG. 7. These hinges 40 can be conventional and it is believed that no further amplification or description thereof is necessary, it being noted that the hinges include horizontally aligned pivot pins 41 defining a common pivot axis about which the mold sections 37 and 38 swing.

Figure 5:
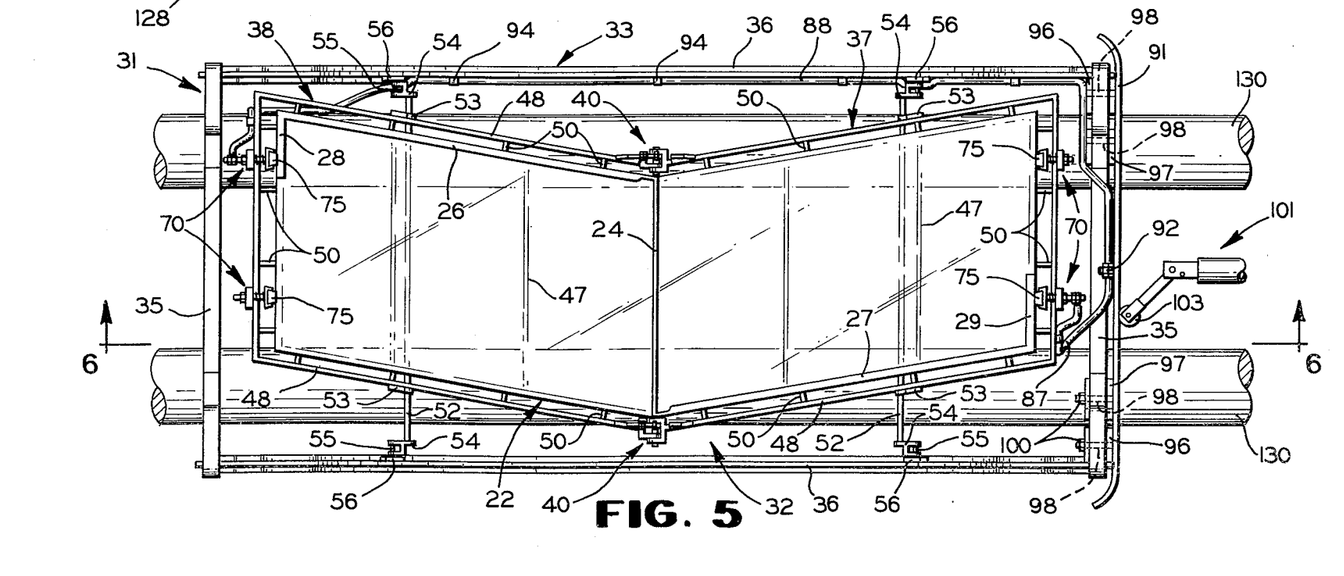
FIG. 5 is a top plan view of the mold assembly shown in FIG. 3.

The mold sections 37 and 38 are substantially identical and mirror images of each other and each comprises a shaping rail 42 of substantially U-shaped configuration in plan having laterally spaced, parallel, side portions 43 and 45 connected by an end portion 46. Tie rods 47 span the space between the shaping rail side portions 43 and 45 and are rigidly secured thereto to maintain the same in fixed position relative to each other. The shaped rail 42 is carried by a mating support rail 48 having the same general outline as shaping rail 42, but slightly larger in peripheral dimension than the latter and connected in spaced relation thereto by separator blocks 50 (FIGS. 5 and 6). The shaping rail 42 is provided with an upper shaping surface 51 upon which the glass sheet rests during the forming thereof and which is spaced above the upper surface of support rail 48.

While a relatively simple, articulated mold having only two pivotal sections has been shown and described in the illustrated embodiment for ease and convenience of description, it should be appreciated that the mold proper may be formed of three or more sections hingedly connected together. The number of sections employed and their configurations are dictated by the specific bent shape desired to be imparted to the particular glass sheet being formed.

To support the mold for movement from the open position of FIG. 6 wherein the flat glass sheets to be bent are received to the closed position of FIG. 7, a transversely extending pivot bar 52 is rigidly secured to each of the mold sections 37, 38 by means of lugs 53 depending downwardly form the associated support rail 48 and through which the bar 52 extends. The opposite ends of each bar 52 are rotatably supported by links 54, in turn pivotally carried by pins 55 secured to lugs 56 rigidly secured to the mold supports 36 of support frame 33. The pivot bars 52 are normally adjusted and located off center of their associated mold sections 37, 38 to allow the mold to close due to their weights unless a force is applied to the outermost ends of such mold sections, causing the same to pivot about bars 52 to raise the inner ends of the sections.

Means are provided for limiting the extent of pivotal motion of the mold sections 37 and 38 to their closed position thereby preventing any tendency toward inverse or over bending. As shown in FIG. 3, such means include a pair of adjustable stops 57 mounted on upstanding lugs 58 affixed to the support rail inner free ends of mold section 38. These stops 57 are provided at their distal ends with bumpers 60 engageable with upstanding abutment members 61 rigidly secured to the adjacent support rail inner free ends of mold section 37.

Stop means also are provided for limiting pivotal movement of the mold sections 37 and 38 to their open position assuring a generally horizontal disposition thereof for proper positioning of the flat glass sheets thereon. As best shown in FIGS. 6 and 7, such means include a pair of adjustable stops 62 mounted on lugs 63 depending downwardly from the support rail inner free ends of mold section 38. Stops 62 are provided with bumpers 65 engageable with downwardly directed abutment members 66 rigidly secured to the adjacent support rail inner ends of mold section 37.

An important feature of the present invention is the provision of pressure stops, generally designated 70, mounted on the transversely extending portions of support rails 48 for properly locating the flat glass sheet slightly above the major portion of the mold sections 37 and 38 when in the open position and for exerting pressure on the ends of the sheet while maintaining the same in proper relation to said mold during the bending thereof. Additionally, such stops 70 serve as electrical contacts for a purpose which will hereinafter be more fully described.

Figure 9:
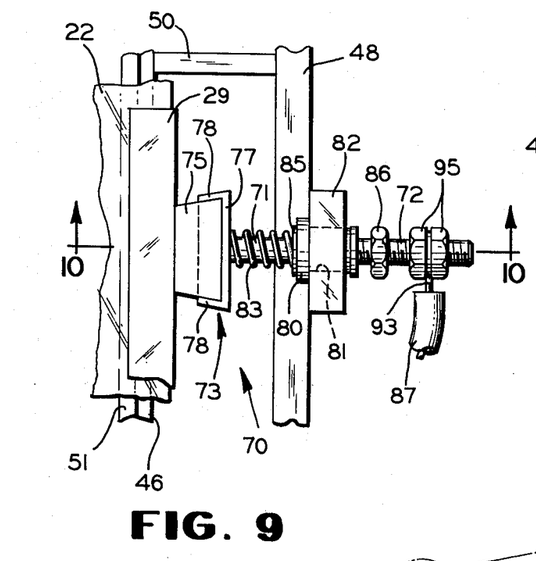
FIG. 9 is a fragmentary top plan view, on an enlarged scale, showing details of the contact stop forming a part of the mold assembly of this invention.
Figure 10:
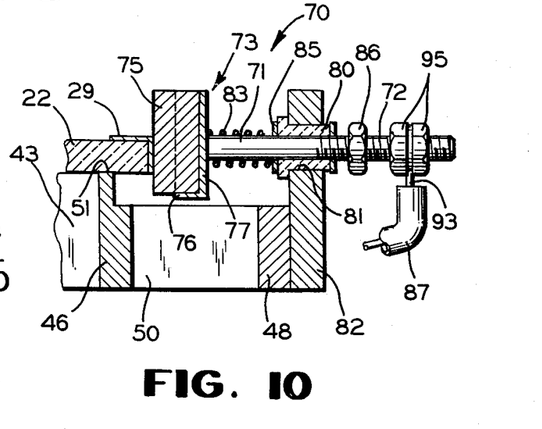
FIG. 10 is a vertical sectional view, taken along the line 10—10 of FIG. 9.

As best shown in FIGS. 9 and 10, each stop comprises an elongated rod 71 having a threaded end portion 72 adapted to receive a conductor lead for a purpose that will presently become apparent. A holder 73 is secured to the other end of rod 71 for receiving a carbon block 75 which also serves as an electrical contact. While block 75 is preferably formed of carbon, it should be understood that the block can be formed of any suitable material possessing good electrical conducting properties.

The holder 73 is provided with a bottom wall 76, a flat rear wall 77, and a pair of converging side walls 78 complementary to the tapered side walls of the block 75. The block 75 is merely slipped downwardly through the open top of the holder against the bottom wall 76 and held in place by the converging side walls 78. This permits convenient replacement of worn or damaged blocks 75.

In order to insulate the mold from the electrical connection through rod 71, the latter extends through a bushing 80 formed of a suitable insulating material and which is frictionally fitted in place in an opening 81 provided in a support plate 82 affixed to the transversely extending portion of support rail 48. A high temperature resistant coil spring 83 is disposed about rod 71 between an abutment washer 85 bearing against the bushing flange and the rear wall of holder 73 to urge block 75 against the edge of the glass sheet as shown in FIG. 10. A nut 86, provided on threaded end portion 72 of rod 71, serves as a stop in limiting axial inward movement of the block under the bias of the spring 83.

As previously mentioned, U.S. Pat. Nos. 3,762,903 and 3,762,904 disclose the process of forming relatively sharp, angular bends in glass sheets by providing an electrically conducting path on at least one surface of the glass sheet along the line about which it is desired to bend the sheet. An electric current is then passed through the path to heat the same by resistance and thereby the glass sheet in the area immediately adjacent or beneath the path, causing the preheated sheet to bend by gravity along the path to form the V-shaped bend. The mold assembly 31 of the present invention is employed to carry out the above process in a mass production operation and incorporates electrical conducting means for delivering the necessary electric charge to the glass sheet to be bent.

Preferably, the electrical current is introduced into the glass sheet at the opposite ends of the sheet remote from such paths 23 rather than at the opposite ends thereof. The reason for this is that the least amount of movement or displacement of the glass sheet relative to the mold during bending occurs at such opposite ends of the sheet, thereby minimizing friction therebetween and the possible removal of or damage to the conducting material which constitutes the electrical conducting path 23. Accordingly, the path is extended to the opposite ends of the glass sheet by means of conductor lines 26, 28 and 27, 29, respectively, formed on the glass sheet to be bent. However, the width or cross sectional area of line 24, which forms the conductive path 23, is substantially less than that of conductor lines 26 and 27 to consequently provide a substantially greater resistance to current flow than the latter and thereby the generation of relatively greater heat to effect the bend along the desired line formed by the path 23. In order to prevent possible damage to the opposite ends of conducting line 24 due to the drastic transition of the greater cross sectional areas of lines 26 and 27 to the lesser cross sectional area of line 24, the cross sectional areas of conductor lines 26 and 27 are reduced, as shown at 26a and 27a in FIG. 2, prior to the joining thereof with conducting line 24.

In accordance with this invention, electrical conducting means are provided on mold assembly 31 to deliver electric current from a suitable source of electrical power to portions of the glass sheet in order to effect the desired relatively sharp angular bends therein. Such means include the opposed contactor stops 70 and a pair of flexible conductor leads 87 and 88 electrically connecting two of the opposed stops 70 to a pair of bus bars 90 and 91 for supplying electrical power to the former. The leads 87 and 88 are connected to bus bars 90 and 91, respectively, by suitable fasteners 92. The other end of each lead is formed with a contact 93 provided with a suitable opening for receiving the threaded end portion 72 of its associated rod 71 and is fixed in place thereon by means of nuts 95 tightened against the opposite sides of the lead contact 93. It should be noted that the conductor lead 88 extends upwardly and transversely along end member 35 and then longitudinally along one of the support frame mold supports 36 and is held in place against the frame by suitable clamps 94.

If desired, bus bars can be mounted on the support frame 33 in lieu of the leads 87 and 88 to electrically connect bus bars 90 and 91 to the opposed contact stops 70. Where more than one bend is desired in a piece of glass, a silver bus bar can be screened or rolled on the edge or top surface of the glass as a connecting means between the two or more primary conducting paths about which the glass is to be bent. Alternatively, an insulated rod can be placed on the cross member to form the connecting link in transporting the current from one primary connecting path to the other.

The bus bars 90 and 91 are connected to the support frame end members 35 and extend transversely thereacross in spaced relation thereto by means of insulating blocks 96 and 97 mounted in similarly configurated openings formed at each end of member 35. As best shown in FIG. 5, the inner faces of bus bars 90 and 91 are provided with threaded studs 98 extending through suitable openings in the blocks 96 and 97. Nuts 100 are tightened on the threaded studs 98 to secure the bus bars 90 and 91 to insulating blocks 96 and 97 and thereby end member 35.

The bus bars 90 and 91 are adapted to be engaged by a pair of electrically conducting probe assemblies, generally designated 101, connected to a suitable source of electrical power (not shown) and forming a part of the furnace through which the mold assemblies 31 are conveyed during the gravity bending operation as will hereinafter be more fully explained. Each probe assembly 101 comprises a contact wheel 103 rotatably journalled in a yoke 105 affixed to the distal end of an arm 106 pivotally mounted between a pair of extensions 107 by means of a pivot pin 108. The extensions 107 are secured to a hollow tube 110 slidably received in a sleeve 111, in turn rigidly secured in a suitable opening formed in a plate 112 removably secured in a furnace opening by means of angle member 113 and fasteners 114. The tube 110 can be secured in a selective adjusted position relative to its associated sleeve 111 by means of a plurality of circumferentially spaced set screws 115.

Figure 8:
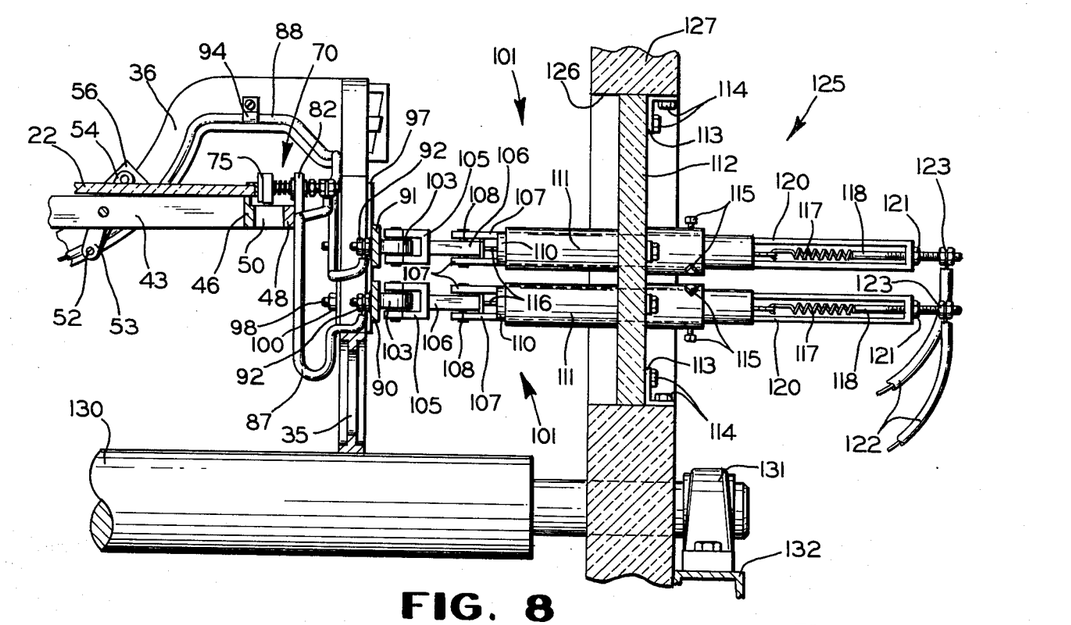
FIG. 8 is a fragmentary, vertical sectional view, taken through the furnace wall, and showing details of the electrical conducting probe assemblies.
Figure 11:
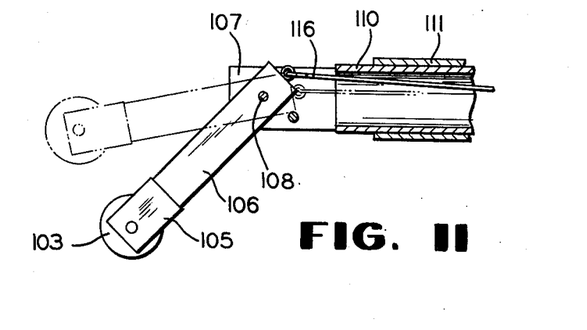
FIG. 11 is a fragmentary, horizontal sectional view, showing a probe arm in a retracted, mold engaging position in full lines and an extended, disengaged position in dotted lines.

Means are provided for biasing the probe arm 106 into an extended position shown in dotted lines in FIG. 11 into the path of movement of the bus bars 90 and 91 during conveyance of the mold assembly 31 through the furnace. Such means include a cable 116 affixed at its one end to the rear end of arm 106 and attached at its other end to a tension spring 117 mounted on a rod 118 adjustably threaded in a casing 120 affixed to the rear end of tube 110. A stop nut 121, provided on the threaded end of rod 118 and bearing against the rear end of casing 120, can be turned in either direction to adjust the tension of spring 117. This outward bias imparted to the probe arm 106 assures extension of the contact wheel 103 into the path of its associated bus bar during advancement of a mold assembly 31 through the furnace. While preferably a spring is employed to extend the probe arm 106 outwardly, it should be understood that fluid actuators or other suitable pressure means may be used in lieu of the spring 117, if desired. Flexible conductors 122 are suitably connected, as shown at 123 in FIG. 8, at their one ends to the rods 118 of probes 101 and at their other ends to a suitable source of electrical power (not shown).

Figure 4:
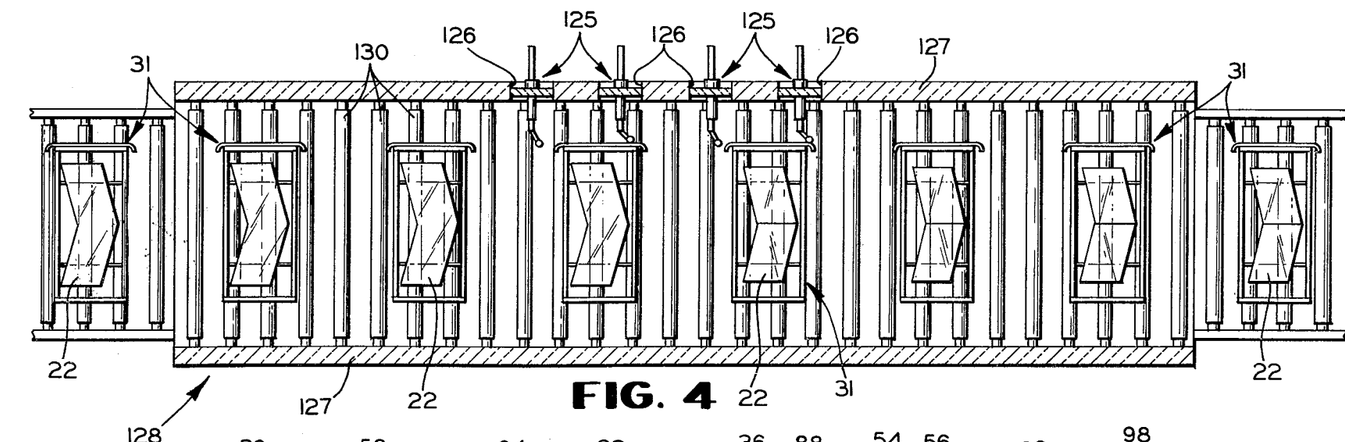
FIG. 4 is a top plan view of a bending furnace showing a plurality of the glass shaping mold assemblies of this invention being conveyed therethrough.

As previously noted, a pair of probe assemblies 101 is rigidly mounted in plate 112, in turn removably secured in a suitable opening formed in the furnace wall. Thus, each pair of probe assemblies 101 and its associated plate 112 form a removable unit 125, which can be selectively inserted into or removed from suitable openings 126 formed in one of a pair of insulated side walls 127 of a tunnel-type bending furnace 128, such as shown in FIG. 4. A number of such units 125 are mounted in a longitudinally spaced relation along furnace wall 127 in such a manner as to assure electrical contact of at least one pair of the probe assemblies 101 with the bus bars 90 and 91 of a mold assembly 31 during its passage through the furnace 128 for a time sufficient to heat the glass sheet in the area of the conducting path 23 to a temperature above the bending point of the glass. The mold assemblies 31 are moved through the furnace 128 on a conveyor system comprising a plurality of parallel conveyor rolls 130 extending transversely across the furnace 128 with their respective opposite ends projecting through the furnace opposite side walls 127 and suitably journalled in bearing blocks 131 mounted on rails 132 (FIG. 8) extending longitudinally along the exterior of the furnace 128.

Prior to bending, the electrically conducting path 23, as defined by line 24, as well as the conductor lines 26 through 29, can be formed on each glass sheet 22 in accordance with the method set forth in U.S. Pat. No. 3,762,903. If desired, a groove may be formed in one or both surfaces of the glass sheet 22 along the line about which it is desired to bend the sheet to facilitate the bending operation as set forth in detail in U.S. Pat. No. 3,762,904, whereby the electrically conducting line 24 may then be formed in one of such grooves. While various materials may be used to form these electrically conducting paths and conductor lines, preferred compositions are comprised of conductive metal pastes. These materials, sometimes also referred to as inks, are applied to the glass sheet by conventional silk screen proceses, painting, or other conventional uniform coating processes and then are heated or fired to fuse the material to the sheet.

Typically, the pastes comprise conductive metal particles, e.g., silver, glass frit particles and organic binders and solvent. Although the conductive silver pastes are ideally suited for forming the electrically conducting paths 23 and conductor lines 26 through 29, other conductive metal pastes may be used, e.g., those containing gold, palladium, platinum and alloys thereof. In addition, air drying dispersions of conductive metals may be employed. One particular material of this type which has been used successfully is "Dag 422", a dispersion of silver plus graphite in a water carrier obtained from the Acheson Colloids Company, Port Huron, Mich. Also, materials such as electrically conducting tapes, which may or may not be removed after the bending step, can be employed.

In a mass production operation, flat glass sheets 22 with electrically conducting paths 23 and conductor lines 26 through 29, respectively, formed thereon, are placed on mold assemblies 31 with each sheet being supported adjacent its opposite transverse edges on the shaping surface 51 of the mold assembly 31 when in its open position (FIG. 6). These opposite edges also engage the opposed locator or electrical contact stops 75 and the flat glass sheet 22 functions as a strut to retain the mold in the open position during the early stages of the bending operation. The mold assemblies 31 are then loaded at spaced intervals on the conveyor at the entrance end of the furnace 128 and are advanced therethrough on conveyor rolls 130. Prior to introducing power to the mold assemblies 31, the glass sheets 22 are heated to a relatively high temperature in furnace 128, for example, above the strain point of the glass but below the temperature at which the glass bends to any significant degree. To this end, temperatures in the range of approximately 900° to 1150° F. have been found satisfactory. This preliminary heating is to prevent inducing permanent stresses in the glass, obviate the tendency of the glass to crack when subsequently heated locally along the electrically conducting path 23 to its bending temperature, and also to enable the accomplishment of this latter step within a time acceptable from a commercial standpoint and with the use of a reasonable amount of electrical energy.

At about the time the advancing glass sheet reaches the desired overall temperature, the bus bars 90 and 91 of the sheet supporting mold assembly 31 engage the contact wheels 103 of the first pair of extended probe assemblies 101 to complete a circuit and supply electrical power to the conducting path 23 via one of the probe assemblies 101, bus bar 90, conductor lead 87, contact stop 75, conductor lines 29, 27, conducting path 23, conductor lines 26, 28, the opposed contact stop 75, conductor lead 88, bus bar 91 and the other probe assembly 101. As the mold assembly 31 advances along the conveyor, each succeeding pair of probe assemblies 101 engages bus bars 90 and 91 after the preceding pair of probe assemblies 101 have been disengaged therefrom to pass substantially the same current, although interrupted, into the mold-glass circuit. While four units 125 or pairs of probe assemblies 101 are employed in the illustrative embodiment of FIG. 4, for ease of illustration it should be appreciated that this number may vary as dictated by the speed of the conveyor rolls 130 and the time necessary to adequately heat the sheet in the area immediately adjacent or beneath path 23 to a temperature above the bending point of the glass. When the area of the sheet underlying path 23 is heated to a temperature above the bending temperature of the glass, for example, above approximately 1200° F., the sheet bends sharply along path 23 and ultimately settles by gravity into the desired generally V-shaped configuration illustrated in FIG. 7.

It should be appreciated that the lesser cross sectional area of line 24 forming the electrically conductive path 23 creates a substantially higher resistance than conductor lines 26–29 so that the former will generate the necessary heat to effect the sharp bend therealong before the lines 26–29 are heated sufficiently to create any undesirable deformation therealong.

As the glass sheet becomes plastic during the heating thereof and begins to sag by gravity, the mold sections 37 and 38 will begin to collapse toward the closed position, pivoting about the hinge assemblies 40. During this closing action, the contact stops 75 are maintained in engagement against the transverse marginal edges of the glass sheet by means of the pressure exerted through their respective springs 83, assuring the continued supply of electrical power to the conducting path 23 about which the relatively sharp bend occurs. The sheet continues to bend sharply along the path 23 with consequent movement of the mold sections 37 and 38 until the latter come to rest in the fully closed position as determined by stops 57. The sheet settles by gravity into registry with the shaping surface 51 of shaping rails 42 in the fully closed position of the mold to produce the desired V-shaped configuration of the finished product.

From the foregoing, it is apparent that the objects of the present invention have been fully accomplished. A novel apparatus is provided for automatically supplying electrical power to selected portions of glass sheets for imparting relatively sharp bends thereto in a continuous, mass production bending operation. Supplemental or secondary electrical conducting elements, constituting the leads 26–29, are formed on the glass sheet to connect the novel electrical conducting means provided on the improved mold assembly to the electrically conductive path formed on the sheet and about which the sheet is bent to a relatively sharp angle. By the provision of pressure loaded electrical contacts, which also serve as locator stops in properly positioning the glass sheet on the mold, electrical contact is continuously maintained regardless of glass movement relative to the mold during the closing of the latter.

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

We claim:

1. A method of bending a glass sheet to a relatively sharp angle comprising: applying a first electrically conducting path to at least one surface of the glass sheet along the line about which it is desired to bend the sheet, applying a second electrically conducting path to said surface extending from the opposite end of said path in opposite directions along first opposite marginal edge portions and then along angularly related second opposite marginal edge portions and terminating at ends therealong disposed inwardly of said first opposite marginal edge portions of said glass, introducing an electrical current into said second electrically conducting path along said second opposite marginal edge portions whereat the least amount of glass displacement occurs during the subsequent bending operation, said current being transmitted along said first opposite marginal edge portions to said first electrically conducting path to heat the sheet in the area immediately adjacent said first path to a temperature above the bending point of the glass, and causing said sheet to bend sharply along said first electrically conducting path.

2. A method according to claim 1, wherein said sheet is heated to an elevated temperature below the bending temperature of the glass prior to the introduction of said electrical current thereto.

3. A method according to claim 2, wherein said sheet is heated to a temperature in the range of from about 900° to 1150° F. prior to introducing said electrical current into said first path, and said area immediately adjacent said first path is heated above approximately 1200° F. when said current is introduced into said first path.

4. A method according to claim 1, wherein said first electrically conducting path is applied in a line having a substantially lesser cross sectional dimension than said second electrically conducting path.

5. Apparatus for bending a glass sheet to a relatively sharp angle comprising: a frame, an outline type bending mold supported on said frame and having a substantially continuous shaping surface formed thereon and conforming to the margin of the glass sheet to be bent, electrically conducting means mounted on said frame and including oppositely disposed electrical contacts mounted on the mold in spaced relation to said shaping surface and engageable with the opposite marginal edge portions of the glass sheet supported on said mold, means maintaining said contacts in engagement with said glass sheet marginal edge portions upon movement of said glass sheet during the bending thereof, and means coupling said electrical conducting means to a source of electrical energy.

6. Apparatus according to claim 5, wherein said bending mold comprises at least a pair of articulated sections movable between an open position and a closed position, and means for hingedly connecting the adjacent ends of said section for pivotal movement between said open and closed positions.

7. Apparatus according to claim 5, wherein each of said electrical contacts comprises a holder mounted on said mold in spaced relation to said shaping surface, a block of electrically conducting material supported in said holder and engageable with the marginal edge of said sheet, and means continuously biasing said block against said glass sheet marginal edge upon movement of said glass sheet during the bending thereof.

8. Apparatus according to claim 7, wherein said conducting material is composed of carbon.

9. Apparatus according to claim 5, wherein said coupling means comprises a pair of bus bars mounted on said frame and engageable by a pair of electrically conducting probe assemblies.

10. Apparatus for bending glass sheets to relatively sharp angles comprising: a furnace having spaced side walls defining a heating chamber, an outline type bending mold having a substantially continuous shaping surface formed thereon and conforming to the margin of the glass sheet to be bent, a conveyor for supporting and advancing said mold in a predetermined path through said furnace, electrical conducting means mounted on said mold including bus bars and portions engageable with marginal edge portions of the glass sheet supported on said bending mold and maintained in contact therewith throughout the entire bending operation, and electrical coupling means mounted in one of said furnace walls and engageable with said bus bars as said mold advances along said path to introduce electrical current via said conducting means into said portions of said glass sheet to heat at least one selective portion thereof above the bending point of the glass and effect a relatively sharp bend about said selective portion.

11. Apparatus for bending glass sheets to relatively sharp angles comprising: a furnace having spaced side walls defining a heating chamber, an outline type bending mold having a substantially continuous shaping surface formed thereon and conforming to the margin of the glass sheet to be bent, a conveyor for supporting and advancing said mold in a predetermined path through said furnace, electrical conducting means mounted on said mold including bus bars and portions engageable with marginal edge portions of the glass sheet supported on said bending mold, and electrical coupling means mounted in one of said furnace walls and engageable with said bus bars as said mold advances along said path to introduce electric current via said conducting means into said portions of said glass sheet to heat at least one selective portion thereof above the bending point of the glass and effect a relatively sharp bend about said selective portion, said electrical conducting portions engageable with said glass sheet marginal edge portions comprising electrical contacts also serving as locator stops in maintaining said glass sheet in a desired position relative to said mold.

12. Apparatus according to claim 11, including means for biasing said electrical contacts against said glass sheet marginal edge portions during the bending of said sheet.

13. Apparatus according to claim 10, wherein said coupling means comprises at least one pair of electrically conducting probe assemblies extendable into the path of movement of said bus bars, respectively, for engagement therewith during advancement of said mold in said predetermined path.

14. Apparatus according to claim 10, wherein said coupling means comprises a plurality of paired electrically conducting probe asemblies extendable into the path of movement of said bus bars, respectively, for sequential engagement therewith during advancement of said mold in said predetermined path.

15. Apparatus according to claim 13, wherein each probe assembly comprises a support member mounted in said one furnace wall, an arm pivotally mounted adjacent one end thereof on said member for pivotal movement between a retracted position and an extended position in the path of movement of its associated bus bar, and a wheel journalled on the other end of said arm and adapted to be engaged by and roll along said associated bus bar as said mold is carried along said predetermined path.

16. Apparatus according to claim 15, including means for biasing said arm and said wheel into the path of movement of said associated bus bar.

17. Apparatus according to claim 10, wherein said bending mold comprises at least a pair of articulated sections movable between an open position and a closed position, and means for hingedly connecting the adjacent ends of said sections for pivotal movement between said open and closed positions.

18. A method according to claim 4, including forming said second electrically conducting path with a portion of reduced cross-sectional dimension and connecting said second electrically conducting path to said first electrically conducting path at said portion of reduced crosssectional dimension.

19. A method of bending a series of glass sheets to relatively sharp angles according to claim 1, including advancing said sheets bodily in spaced relation through a heating zone and heating said sheets to elevated temperatures below the bending temperature of the glass in said heating zone prior to sequentially introducing said electrical current thereto.

20. Apparatus according to claim 5 wherein said oppositely disposed electrical contacts additionally form locating means maintaining said glass sheet in a desired position relative to said mold.

21. Apparatus according to claim 5 including means for insulating said contacts from said mold.

* * * * *